Nov. 18, 1958 J. I. PANKOVE 2,861,262

PHOTOELECTRIC CODING DEVICE

Filed Aug. 23, 1955 3 Sheets-Sheet 1

INVENTOR.
JACQUES I. PANKOVE
BY Charles H. Brown
ATTORNEY

Nov. 18, 1958 J. I. PANKOVE 2,861,262

PHOTOELECTRIC CODING DEVICE

Filed Aug. 23, 1955 3 Sheets-Sheet 2

INVENTOR.
JACQUES I. PANKOVE
BY
Charles H. Brown
ATTORNEY

Nov. 18, 1958 J. I. PANKOVE 2,861,262

PHOTOELECTRIC CODING DEVICE

Filed Aug. 23, 1955 3 Sheets-Sheet 3

INVENTOR.
JACQUES I. PANKOVE
BY Charles H. Brown
ATTORNEY 2,861,262
Patented Nov. 18, 1958

2,861,262

PHOTOELECTRIC CODING DEVICE

Jacques I. Pankove, Princeton, N. J., assignor to Radio Corporation of America, a corporation of Delaware Application August 23, 1955, Serial No. 530,164
17 Claims. (Cl. 340—365)

This invention relates to photoelectric devices. Particularly, the invention is a photoelectric coding device and circuit arrangement for converting a spatial light pattern into a time sequential electric pulse group.

A circuit to produce a sequence of electric pulses which occur in rapid succession and in a pattern which relates in a predetermined manner to the pattern of a signal applied to the input of the circuit is an integral part of the operation of most modern electronic equipment. Circuits of this type are found, for example, in telegraph and computer systems and often comprise a large number of components such as electron discharge devices, electromagnetic relays and switches. Due to the number of components required, the circuits tend to be complicated and can be difficult and expensive to construct and maintain. A need exists for simple and reliable coding circuit arrangements for converting signals applied to the input of the circuits either sequentially, simultaneously or in parallel into a series of signals arranged on a single electrical conductor in a predetermined time sequence or pattern.

The invention is a solution of this need in the form of a photoelectric device and circuit arrangement. Photoelectric devices are well known in the art and have been adapted for use in many different types of circuits where a rapid speed of operation and simple construction are desired. In the use of photoconductive semiconductors in photoelectric circuits, it has been found that the resistance of the semiconductors changes in accordance with the illumination of a surface area thereof. This operating characteristic permits the use of photoconductive semiconductors in current control arrangements. Further, because of the relatively high current output of such semiconductors, they are suitable for use in circuits where it is desired to directly operate relays or other switching devices, for example, in the field of computers and telegraphy. These and other advantages of photoconductive semicondutcors are utilized by the invention to obtain a coding circuit arrangement which is simple in construction and reliable in operation.

An object of the invention is to provide an improved coding circuit arrangement for converting signals into a sequence of electric pulses arranged on a single electrical conductor in a pattern or time sequence related in a predetermined manner to the pattern of the signals applied to the circuit.

Another object of the invention is to provide a new and novel photoelectric coding device and circuit arrangement of simple construction for converting a spatial light pattern containing coded information and applied to the device either sequentially, simultaneously or in parallel into a series of electric pulses arranged on a single conductor in a pattern related to the light pattern in a predetermined manner.

In general, the invention comprises a photoconductive semiconductor of the type having mobile minority charge carriers. At least one light source is positioned adjacent to the semiconductor. Control means are associated with the light source and cause the light source to project a spacial light pattern on a surface area of the semiconductor. The light pattern comprises coded information which is reproduced as an illuminated spot or spots on the suface of the semiconductor. A collector electrode is connected to a center point on one surface of the semiconductor. The collector electrode may be a P–N junction, a surface barrier or a point contact. A plurality of non-rectifying connections are symmetrically disposed along the edge of the surface of the semiconductor about the collector electrode. A sweep function generator is connected to the non-rectifying connections and produces a rotating electric field in the bulk of the semiconductor. There is one position of the rotating electric field at which minority charge carriers produced by the illumination of a spot on the surface area of the semiconductor are forced to the collector electrode causing a current pulse to appear in the output circuit of the semiconductor. When a number of spots are illuminated on the surface area of the semiconductor, the light generated minority charge carriers are swept in turn from the various illuminated spots to the collector electrode by the rotating electric field. A series of electric output pulses is produced according to the passage of the rotating electric field and related to the spacial light pattern in a predetermined manner.

A more complete description of the invention will be given in connection with the accompanying drawing in which.

Figures 1, 2, 3:
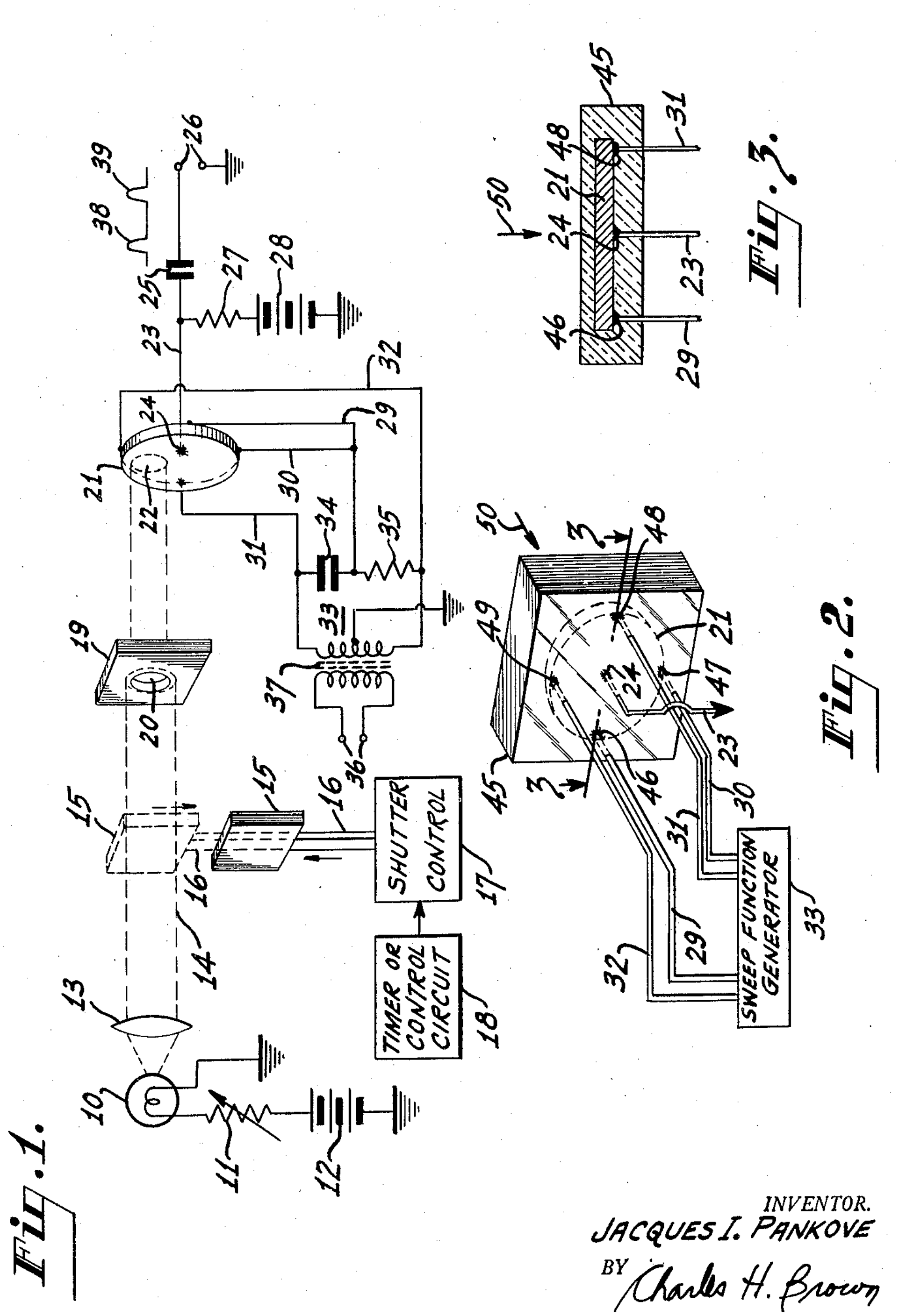
Figure 1 is a circuit diagram of one embodiment of a photoelectric coding circuit arrangement constructed according to the invention.
Figure 2 is an elevation of a photoconductive semiconductor suitable for use in the photoelectric coding circuit arrangement of the invention.
Figure 3 is a cross-sectional view of the photoconductive semiconductor taken along line 3—3 of Figure 2.

Referring to Figure 1, there is shown a circuit diagram of one embodiment of a photoelectric coding device and circuit arrangement constructed according to the invention. The circuit includes a light source shown as a lamp 10, the operating circuit of the lamp 10 comprising a variable resistor 11 and a source of unidirectional potential 12. A cathode ray tube or similar light source may be used in place of lamp 10, if desired. An optical lens 13 is positioned adjacent to the lamp 10 and focuses the light rays emanating from the lamp 10 into a light path 14. A shutter 15 is positioned so as to cut off the light path 14 when the shutter 15 is in an extended position. The shutter 15 is secured to a movable rod 16 which is operated in a reciprocating fashion by a shutter control 17 in the direction of the arrows shown in Figure 1. In an extended position, as shown by the dotted lines, the shutter 15 cuts off the light path 14. When in a retracted position, as shown by the solid lines in Figure 1, shutter 15 is moved out of the light path 14 and the passage of the light rays along the path 14 is unhindered. The operation of the shutter control 17 is controlled by a timer or control circuit 18. The control circuit 18 comprises a manually or automatically operated keying device of any suitable type well known in the art and applies a control signal to the shutter control 17 to cause the rod 16 to move the shutter 15 into or out of the light path 14.

Assuming that the shutter 15 is in the retracted position, the light path 14 is projected on a diaphragm member 19 which includes an aperture 20. The light path 14 passes through the aperture 20 and in doing so is changed into a particular pattern. While a circular aperture 20 is shown, the aperture 20 may assume any shape desired and may comprise a plurality of apertures. The light path 14 is, thereafter, projected onto the surface area of a photoconductive semiconductor 21, the light path 14 illuminating a spot 22 on the surface area thereof. The semiconductor 21 is constructed of a homogeneous N or P type single crystal having mobile minority charge carriers, for example, germanium, silicon, germanium-silicon alloys or other intermetallic compounds. The semiconductor 21 is shown in Figure 1 as having the form of a disk but the invention is not to be considered limited to this particular configuration. While a circular shape is preferred, square shaped semiconductors or semiconductors of other shapes may be used.

Lead 23 is attached by a rectifying collector connection 24, shown by dotted lines, to a center point on a surface of the semiconductor 21. Lead 23 connects the center point of semiconductor 21 to output terminals 26 over a path including direct current blocking condenser 25 and to ground over a path including resistor 27 and a source of unidirectional potential 28. The term ground, as used in the specification, is not limited to an actual earth connection but is deemed to include any point of fixed or zero alternating reference potential. When a P type crystal is used for the semiconductor 21, the source 28 is poled to apply a positive voltage to the collector electrode 24 via lead 23, as shown in Figure 1. If an N type crystal is used, however, the source 28 is reversed in polarity to supply a negative voltage to the collector electrode 24.

Four leads 29, 30, 31 and 32 are connected at one end by non-rectifying connections to the bulk of the semiconductor 21. The non-rectifying connections, which are described more fully in connection with Figure 2, are symmetrically disposed along the edge of a surface of the semiconductor 21. The leads 29, 30, 31 and 32, as well as lead 23, are connected to the surface of semiconductor 21 which is not illuminated by the light path 14. Actually, the leads may be connected to either surface of the semiconductor 21. However, it is preferable that the surface which is to be illuminated not be cluttered with the leads and connections therefor. Leads 29, 30, 31 and 32 are connected at their other ends to a sweep function generator 33 comprising a series connected capacitor 34 and resistor 35, the generator 33 being conventional in design. An alternating current is fed from terminals 36 which are connected to a source of alternating potential, not shown, across the primary winding of a transformer 37. One side of the secondary winding of transformer 37, which is center tapped to ground, is connected to condenser 34 and to lead 31. The other side of the secondary winding of transformer 37 is connected to resistor 35 and to lead 32, the series circuit comprising condenser 34 and resistor 35 being connected in parallel with the secondary winding of transformer 37. Leads 29 and 30 are connected to the junction between condenser 34 and resistor 35.

The operation of the sweep function generator 33 is well known in the art and need not be described in detail. It is to be understood that the arrangement of the sweep function generator 33 is given only by way of example and that other sweep function generator arrangements also well known in the art may be used if desired. An alternating potential applied to the series circuit comprising condenser 34 and resistor 35 causes the voltage developed across condenser 34 to lag by 90 degrees the voltage developed across the resistor 35. The voltage applied between the oppositely positioned connections on the bulk of semiconductor 21 to which leads 29 and 31 are connected will vary in accordance with the voltage developed across condenser 34. In the same manner, the voltage applied between the oppositely positioned connections on the bulk of semiconductor 21 to which leads 30 and 32 are connected will vary in accordance with the voltage developed across resistor 35. Sine wave voltages of equal frequency and 90 degree phase displacement are applied to the bulk of the semiconductor 21 causing a rotating electric field to be produced therein. In the arrangement shown in Figure 1, the electric field will rotate in a clockwise direction. By merely reversing the position of condenser 34 and resistor 35 in the operation of the sweep function generator 33, however, the electric field may be caused to rotate in the reverse or counterclockwise direction.

When the coding circuit of the invention, as shown in Figure 1, is in a non-operating or standby condition, the shutter 15 is in the extended position shown by the dotted lines and the light path 14 is cut off. The sweep function generator 33 continues to produce a rotating electric field in the semiconductor 21. However, as the light path 14 is cut off, no illumination of the surface area of semiconductor 21 occurs and an output signal is not fed from the semiconductor 21 to the output terminals 26 via lead 23. As is characteristic in photoconductive semiconductor circuits, the semiconductor 21 will pass a certain amount of current (known as "dark current") over a path including the source of unidirectional potential 28, the secondary winding of transformer 33, leads 29 and 32, connection 24 and lead 23. The direct current blocking condenser 25, however, prevents this current from appearing at the output terminals 26.

Upon the manual or automatic operation of the timer or control circuit 18, a control signal is applied to shutter control 17. The shutter control 17 operates and causes the rod 16 to move the shutter 15 out of the light path 14. The light path 14 passes unhindered from the lamp 10 through the aperture 20 of diaphragm 19 and illuminates the spot 22 on the surface of the semiconductor 21. It is believed that the photoconductive effect which occurs is caused by the generation of minority charge carriers in the illuminated area, holes in N-type semiconductors and electrons in P-type semiconductors. The minority charge carriers flow in the direction of the electric field; holes flow in the most positive direction while electrons flow toward the most negative region. Hence, when the rotating electric field passes through the illuminated spot 22 with a polarity to draw the minority carriers radially to the center of the device 21, these carriers are collected by collector electrode 24. The increased current flow is reflected by a pulse 38 in the output circuit of the semiconductor 21. Pulse 38 is fed to output terminals 26 over a path including lead 23 and condenser 25. Assuming that the shutter 15 remains in the retracted position, the next rotation of the electric field in semiconductor 21 causes a second pulse 39 to appear in the output circuit and so on. So long as the shutter 15 is held in a retracted position, each rotation of the electric field in semiconductor 21 causes a pulse to appear at the output terminals 26. The coding circuit of the invention, therefore, is adaptable for use in any system where it is desired to supply a series of pulses during periods of predetermined duration by the operation of the timer or control circuit 18.

The frequency of the output pulses is equal to the rotating electric field frequency in the semiconductor 21 which is, in turn, equal to the frequency of the alternating potential applied to the terminals 36. Therefore, the frequency of the output pulses can be set by applying an alternating potential of predetermined frequency to terminals 36. As the amplitude of the current output of the semiconductor 21 is directly proportional to the strength of illumination thereof, the amplitude of the output pulses 38 and 39 may be determined by adjusting the variable resistor 11 in the operating circuit of lamp 10, thereby, varying the strength of the light rays emanating from the lamp 10. A similar result would be achieved by mounting the lamp 10 on a suitable carrier, not shown, and, by moving the carrier toward or away from the semiconductor 21, varying the length of the light path 14. Also, the light path 14 could be modulated by the use of variable filters, diaphragms, polarizers and so on. A series of pulses is produced in a pattern bearing a preassigned relation to the coded information contained in the pattern of the light path 14 and to the frequency of the control signals applied to the semiconductor 21 by the operation of the sweep function generator 33. While an arrangement for projecting a light pattern onto a surface of the semiconductor 21 is shown in Figure 1, any arrangement may be used which is suited to the needs of a particular application.

Figure 2 is an elevation of the semiconductor 21, shown in Figure 1, and discloses the manner in which the leads 23, 29, 30, 31 and 32 are connected to the bulk of the semiconductor 21 and the manner in which the semiconductor 21 would be used in actual practice. Figure 3 is a cross-sectional view taken along line 3—3 of Figure 2. In actual operation, the semiconductor 21 is surrounded and protected by a transparent insulator 45. The insulator 45 may be made of a bioplastic material or, for example, of a material known commercially as Araldite. As shown more clearly in Figure 3, the semiconductor disk 21 is suspended in and completely enclosed by the insulator material 45. Referring to Figure 2, the leads 29, 30, 31 and 32 are connected from the sweep function generator 33 through the insulator material 45 to the non-rectifying or ohmic connections 46, 47, 48 and 49, respectively, which are arranged symmetrically about the edge of a surface of the semiconductor 21. Output lead or collector electrode 23 is connected through the insulator material 45 by the P-N connection 24 to the center point of the same surface of the semiconductor 21 to which leads 29, 30, 31 and 32 are connected. As mentioned above, it is preferred that the illuminated surface of the semiconductor 21 not be cluttered by the connections and leads. Accordingly, the light source 10, shown in Figure 1, will be operated to project the light path 14, also shown in Figure 1, in the direction of the arrow 50 onto the uncluttered surface of the semiconductor 21, the leads 23, 29, 30, 31 and 32 all being connected to the opposite surface thereof.

Figures 4, 5:
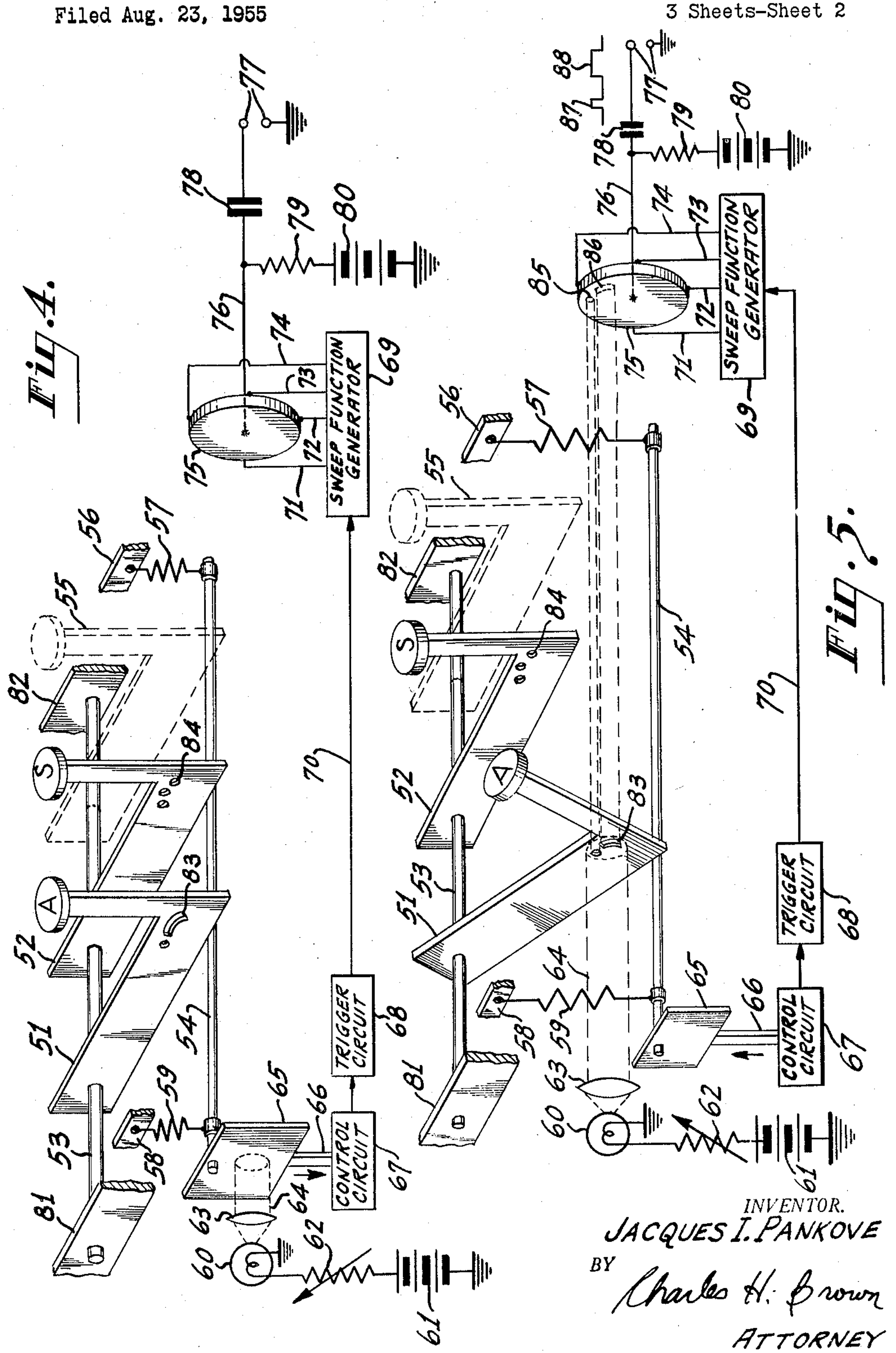
Figure 4 is a circuit diagram of another embodiment of the photoelectric coding circuit arrangement of the invention including a typewriter keyboard in standby or rest condition.
Figure 5 is a circuit diagram showing the circuit arrangement of Figure 4 in operating condition.

A circuit diagram of another embodiment of a photoelectric coding circuit arrangement constructed according to the invention and adapted for use in conjunction with a typewriter keyboard is shown in Figures 4 and 5. Referring to Figure 4, a typewriter keyboard is represented by typewriter keys 51 and 52 constructed in a manner well known in the art and designated by the letters A and S. The keys 51 and 52 are mounted on a rod 53 which is supported by brackets 81 and 82 secured to a suitable supporting framework, not shown, in such a manner that the keys 51 and 52 are movable about the rod 53, the rod 53 extending through one end of the shanks of the keys 51 and 52. A rod 54 is mounted so as to engage the under portions of the keys 51 and 52, the keys 51 and 52 being spaced along the rod 54. While only two keys 51 and 52 of a typewriter keyboard are shown for ease of description, it is to be understood that additional keys 55, shown by dotted lines and representing other letters of the alphabet, may be secured to the rod 53 and spaced along the rod 54 in the same manner as are keys 51 and 52. Apertures are arranged at the ends of the shanks not connected to the rod 53 of each of the keys 51, 52 and 55. The apertures are in the form of the Morse code. For example, the apertures 83 in the shank of key 51, which represents the letter A, are in the form of a dot-dash. The apertures 84 arranged in the shank of key 52, which represents the letter S, are in the form of dot-dot-dot. Similarly, the apertures positioned in the shanks of each of the keys 55 will correspond in Morse code to the letter of the alphabet which the respective keys represent. The rod 54 is connected at one end to a bracket 56 secured to the supporting framework of the typewriter keyboard, not shown, by a spring 57. Similarly, the other end of the rod 54 is connected to a second bracket 58 secured to the supporting framework of the typewriter keyboard, not shown, by a spring 59. The springs 57 and 59 are under sufficient tension to cause the rod 54 to support the keys 51, 52 and 55 in the position shown in Figure 4.

A light source, shown as lamp 60, is opreated by a circuit comprising a source of unidirectional potential 61 and variable resistor 62. The light rays emanating from the lamp 60 are focused by an optical lens 63 into a light path 64. A shutter 65 is secured to one end of rod 54. The lamp 60 and lens 63 are positioned so that, when the rod 54 and shutter 65 are in the positions shown in Figure 4, the light path 64 is projected onto the shutter 65. The shutter 65, therefore, acts to cut off the light path 64 when in this position. The shutter 65 is connected to a rod 66. The rod 66 is arranged to move in a reciprocating manner to operate a control circuit 67. As will be described more fully in connection with Figure 5, the control circuit 67 comprises a switching arrangement of any type well known in the art which operates to convert the mechanical movement of rod 66 into an electric control signal which is applied to a trigger circuit 68. The trigger circuit 68 operates in response to the control signal to apply one cycle of predetermined frequency to the sweep function generator 69 via lead 70. The sweep function generator 69 operates in exactly the same manner as the sweep function generator 33 described in connection with Figure 1 in response to the signal to apply one cycle of sine wave voltages of equal frequency and 90 degree phase displacement via leads 71, 72, 73 and 74 to a photoconductive semiconductor 75. The semiconductor 75 is constructed in exactly the same manner as semiconductor 21 described in connection with Figures 1, 2 and 3, and, therefore, the description of the semiconductor 75 need not be repeated. Lead 76 is connected to the center point of a surface of the semiconductor 75 and connects the center point to the output terminals 77 over a path including direct current blocking condenser 78 and to ground over a path including resistor 79 and a source of unidirectional potential 80.

When the keys 51, 52 and 55 are in the positions shown in Figure 4, the coding circuit of the invention is in a non-operating or standby condition. Shutter 65 cuts off the light pattern 64 preventing the illumination of the semiconductor 75. In the absence of movement of the rod 66, the control circuit 67 remains inoperative and, as the trigger circuit 68 is not operated to apply a signal to sweep function generator 69 via lead 70, the sweep function generator 69 also remains in a non-operating condition.

Figure 5 discloses the embodiment of the invention shown in Figure 4 in an operating condition. It will be assumed that an operator wishes to transmit the letter A by the operation of the coding device of the invention. Key 51 is depressed causing the key 51 to move about the rod 53 in a downward direction. The downward movement of the key 51 exerts pressure on the rod 54 counteracting the tension in the springs 57 and 59. As the rod 54 is moved downwardly, the shutter 65 which is secured to one end of the rod 54 is caused to move in a corresponding direction. The movement of the rod 54 by the key 51 continues until the light path 64 is no longer cut off by the shutter 65. The lamp 60 and semiconductor 75 are positioned in relation to the apertures 83 and 84 in the shanks of the keys 51 and 52, respectively, in such a manner that when the key 51 or 52 is depressed the aperture 83 or 84 will appear in the light path 64 connecting the lamp 60 and the semiconductor 75. The light path 64, key 51 having been depressed, passes through the apertures 83, the pattern of the light path 64 being converted by the form of the apertures 83. The surface of the semiconductor 75 facing the lamp 60 will be illuminated in accordance with the pattern of the light path 64 determined by the form of the apertures 83. The light path 64 having been converted into a dot-dash pattern, a spot 85 in the form of a dot will be illuminated on the surface of the semiconductor 75, as will a spot 86 in the form of a dash.

At the same instant that the shutter 65 is removed from the light path 64, the downward movement of the shutter 65 by the rod 54 causes the rod 66 to operate the control circuit 67. The control circuit 67 in response to the movement of the rod 66 applies a control signal to the trigger circuit 68. The trigger circuit 68 in response to the control signal applies an alternating current of predetermined frequency to the sweep function generator 69 via lead 70. The alternating current signal applied to the sweep function generator 69 by the trigger circuit 68 is of sufficient duration to cause the sweep function generator 69 to produce one complete rotation of an electric field in the semiconductor 75 via leads 71, 72, 73 and 74. In the example given in Figure 5, the electric field will be caused to rotate in a clockwise direction. Minority charge carries are generated in the area of the spots 85 and 86 in a number bearing a direct relation to the strength of the light path 64. As the electric field rotates in the semiconductor 75 from a point removed from spots 85 and 86, the polarity in the area of spot 85 assumes a direction which forces the photo generated carriers to the center point of the semiconductor 75. An electric pulse 87 appears at the output terminals 77 corresponding to the spot 85. As the electric field continues to rotate, the polarity in the area of spot 86 next assumes a direction which forces the photo generated carriers therein to the center of the semiconductor 75. A second electric pulse 88 corresponding to the spot 86 appears at the output terminals 77 which follows pulse 87. The coding circuit of the invention, therefore, operates to convert a spacial light pattern containing code information simultaneously applied to the semiconductor 75 into a time sequence of electric pulses appearing along a single conductor 76 in a pattern related to the pattern of the light path 64 in a predetermined manner.

When the key 51 is released by the operator, the tension in the springs 57 and 59 causes the rod 54 to move in an upward direction. The movement of the rod 54 returns key 51 to the starting position as shown in Figure 4. The movement of the rod 54 also causes the shutter 65 to be moved to its original position and the light path 64 is cut off. As the light path 64 is cut off, no illumination of the semiconductor 75 can occur. If the operator, thereafter, operates key 52 placing apertures 84 in the light path 64, the coding circuit of the invention will operate in the same manner described above to produce at the output terminals 77 a series of three electric pulses corresponding to the letter S in the Morse code. The operation of any of the keys 55 will cause a series of electric pulses to appear at the output terminals 77 corresponding in Morse code to the letter of the alphabet which the particular key depressed represents. It may be seen, therefore, that the embodiment of the invention shown in Figures 4 and 5 is particularly adaptable for use in telegraph systems or similar forms of communication. While the apertures 83 and 84 are shown in the form of characters of the Morse code, the invention is not limited to this particular arrangement. The apertures 83 and 84 and the apertures in the keys 55 can be arranged in the form of the Baudot code or in any other code system which it is desirable to utilize. The operation of the coding circuit of the invention is such that the illumination of the surface area of the semi-conductor 75 by a spacial light pattern 64, which includes code information simultaneously illuminating various spots on the surface of the semiconductor 75, causes a sequential series of electric pulses to appear at output terminals 77 in a pattern related to the pattern of the light path 64 in a predetermined manner. As pointed out in connection with Figure 1, the frequency of the pulse train appearing at the output terminal 77 will be determined by the frequency of the alternating current signal applied to the sweep function generator 69 by the operation of the trigger circuit 68 via lead 70.

Figure 6:
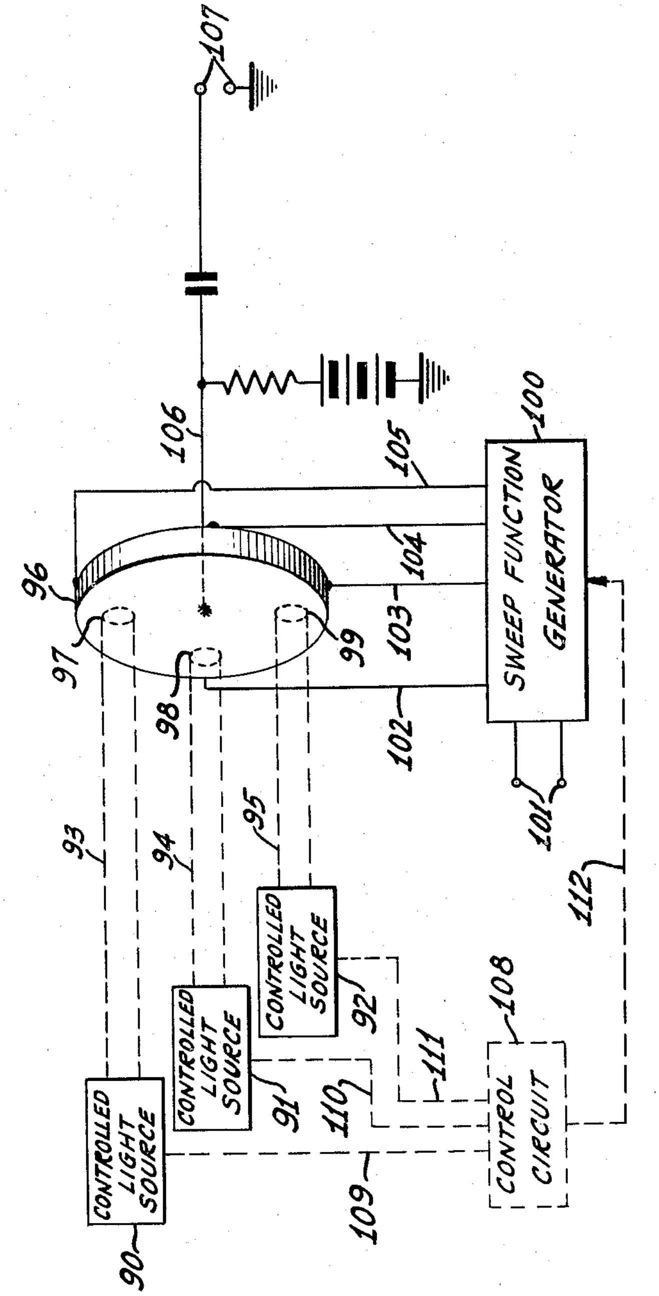
Figure 6 is a circuit diagram of still another embodiment of the invention.

A still further embodiment of the invention is shown in Figure 6. While a single light source has been shown and described in connection with Figures 1, 4 and 5, the invention is not limited to this arrangement. As shown in Figure 6, a plurality of controlled light sources 90, 91 and 92 may be utilized. Each of the light sources 90, 91 and 92 may be controlled in the manner shown in Figures 4 and 5 or in some other suitable manner to project light patterns by the light paths 93, 94 and 95, respectively, on to a surface of the photoconductive semiconductor 96. The pattern of each of the light paths 93, 94 and 95 includes code information which is recorded as illuminated spots 97, 98 and 99, respectively, on the surface of the semiconductor 96. As the sweep function generator 100 is operated by the alternating current applied to the terminals 101, the sine wave voltages applied to the semiconductor 96 via leads 102, 103, 104 and 105 produce a rotating electric field in the semiconductor 96. Assuming that the electric field is set to rotate from a starting position ahead of spot 99 and behind spot 97 on the surface of the semiconductor 96 in a clockwise direction, the light generated carriers in the area of spot 99 are first forced to the center of the semiconductor 96 causing a pulse or series of pulses to appear along the lead 106 which is connected to output terminals 107. The pulse or series of pulses so produced will appear in a pattern corresponding to the pattern of the light path 95. As the field continues to rotate, the carriers generated in the area of spot 98 are next forced to the center of the semiconductor 96 producing a pulse or series of pulses appearing along lead 106 in a pattern corresponding to the pattern of the light path 94. The carriers generated in the area of spot 97 are next forced to the center of the semiconductor 96 and a pulse or series of pulses will appear along lead 106 in a pattern corresponding to that of the light path 93. The illuminated spots 99, 98 and 97 are, therefore, sequentially converted in that order by the rotating electric field into electric pulses sequentially appearing along lead 106.

The controlled light sources 90, 91 and 92 can be operated to project light patterns either sequentially, simultaneously or in parallel on to a surface of semiconductor 96. The controlled light sources 90, 91 and 92 may be operated independently of one another to project light patterns on to a surface of the semiconductor 96 in a particular application of the invention, in which the synchronized operation of the controlled light sources is not necessary or desired. However, in a multiplex system where it is necessary to synchronize the operation of the controlled light sources 90, 91 and 92 with the operation of the sweep function generator 100 to cause the photoelectric coding circuit of the invention to produce a sequence of electric pulses at the output terminals 107 in a predetermined manner, a control circuit 108 is connected to source 90 via lead 109, to source 91 via lead 110, to source 92 via lead 111 and to the sweep function generator 100 via lead 112. The synchronizing circuit comprising the control circuit 108 and leads 109, 110, 111 and 112 is shown in Figure 6 by dotted lines. The control circuit 108 by synchronizing the operation of the controlled light sources 90, 91 and 92 with the operation of the sweep function generator 100 causes the coding circuit to operate to produce a multiplex signal at the output terminals 107 comprising a series of electric pulses in a pattern related to the pattern of the respective light patterns 93, 94 and 95 in a predetermined manner.

Having described the invention, I claim:

1. A photoelectric coding circuit comprising, in combination, a photoconductive semiconductor of the type having mobile minority charge carriers, a light source, means for controlling the operation of said source to project a spacial light pattern on to an area of a surface of said semiconductor, the application of said spacial light pattern to said surface causing the generation of minority charge carriers in the illuminated area, a sweep function generator connected to said semiconductor, means for operating said generator to produce a rotating electric field in said semiconductor, a collector electrode connected to a surface of said semiconductor, an output lead connected to said collector electrode, said rotating electric field forcing said minority carriers to said collector electrode and producing a series of electric pulses along said lead in a pattern related to said light pattern in a predetermined manner.

2. A photoelectric coding circuit comprising, in combination, a photoconductive semiconductor of the type having mobile minority charge carriers, a light source, a shutter mechanism, means including said shutter mechanism for controlling the operation of said source to project a spacial light pattern on to an area of a surface of said semiconductor, the application of said spacial light pattern to said surface causing the generation of minority charge carriers in the illuminated area, a plurality of non-rectifying connections arranged symmetrically along the edge of a surface of said semiconductor, a sweep function generator, means for connecting said generator to said non-rectifying connections, means for operating said generator to produce a rotating electric field in said semiconductor, a rectifying connection positioned at the center point of a surface of said semiconductor, an output lead connected to said rectifying connection, said rotating electric field forcing said minority charge carriers to said rectifying connection and producing a series of electric pulses along said lead in a pattern related to said light pattern in a predetermined manner.

3. A photoelectric coding circuit comprising, in combination, a photoconductive semiconductor of the type having mobile minority carriers and in the form of a disk, a light source, focusing means for projecting light rays emanating from said source on to an area of a flat surface of said semiconductor, a shutter mechanism, means for operating said shutter mechanism to convert said light rays into a spacial light pattern, the application of said spacial light pattern to said surface causing the generation of minority charge carriers in the illuminated area, a sweep function generator connected to said semiconductor, means for operating said generator to produce a rotating electric field in said semiconductor, a collector electrode connected to the center point of a flat surface of said semiconductor, an output lead connected to said collector electrode, said rotating electric field forcing said minority charge carriers to said collector electrode and producing a series of electric pulses along said lead in a pattern related to said light pattern in a predetermined manner.

4. A photoelectric coding circuit comprising, in combination, a photoconductive semiconductor of the type having mobile minority carriers and in the form of a disk, a light source, focusing means for projecting light rays emanating from said source on to an area of a flat surface of said semi-conductor, an electromechanically operated shutter mechanism, means for operating said shutter mechanism to convert said light rays into a spacial light pattern, the application of said spacial light pattern to said surface of said semiconductor causing the generation of minority charge carriers in the illuminated area, a plurality of non-rectifying connections arranged symmetrically along the edge of a flat surface of said semiconductor, a sweep function generator, means for connecting said sweep function generator to said non-rectifying connections, a rectifying connection positioned at the center point of the surface of said semiconductor to which said non-rectifying connections are also connected, an output lead connected to said rectifying connection, means for operating said generator to produce a rotating electric field in said semiconductor, said rotating electric field forcing said generated minority charge carriers to said rectifying connection and producing a series of electric pulses along said lead in a pattern related to said light pattern in a predetermined manner.

5. A photoelectric coding circuit comprising, in combination, a homogeneous single crystal of germanium in the form of a disk, a light source, an electromechanically operated shutter mechanism, means including said shutter mechanism for controlling the operation of said source to project a spacial light pattern on to an area of a flat surface of said crystal, the application of said spacial light pattern to said surface of said crystal causing the genertion of minority charge carriers in the illuminated area, a plurality of non-rectifying connections arranged symmetrically along the edge of a flat surface of said semiconductor, a sweep function generator, means for connecting said sweep function generator to said non-rectifying connections, a rectifying connection positioned at the center point of the surface of said crystal to which said non-rectifying connections are also connected, an output lead connected to said rectifying connection, means for operating said generator to produce a rotating electric field in said crystal, said rotating electric field forcing said generated minority charge carriers to said rectifying connection and producing a series of electric pulses along said lead in a pattern related to said light pattern in a predetermined manner.

6. A photoelectric coding circuit comprising, in combination, a homogeneous single crystal of silicon in the shape of a disk, a light source, an electromechanically operated shutter mechanism, means including said shutter mechanism for controlling the operation of said source to project a spacial light pattern on to an area of a flat surface of said crystal, the application of said spacial light pattern to said surface of said crystal causing the generation of minority charge carriers in the illuminated area, a plurality of non-rectifying connections arranged symmetrically along the edge of a flat surface of said crystal, a sweep function generator, means for connecting said generator to said non-rectifying connections, a rectifying connection positioned at the center point of the surface of said crystal to which said non-rectifying connections are also connected, an output lead connected to said rectifying connection, means for operating said generator to produce a rotating electric field in said crystal, said rotating electric field forcing said generated minority charge carriers to said rectifying connection and producing a series of electric pulses along said lead in a pattern related to said light pattern in a predetermined manner.

7. A photoelectric coding circuit comprising, in combination, a photoconductive semiconductor of the type having mobile minority charge carriers and in the form of a disk, a light source, a shutter mechanism, means including said shutter mechanism for controlling the operation of said source to project light rays along a path on to an area of a flat surface of said semiconductor, a member comprising an aperture of predetermined configuration positioned in the path of said light rays, said light rays being converted into a spacial light pattern in accordance with the configuration of said aperture upon the passage of said light rays therethrough, the application of said spacial light pattern to said surface of said semi-conductor causing the generation of minority charge carriers in the illuminated area, a plurality of non-rectifying connections arranged symmetrically along the edge of the flat surface of said semiconductor opposite said surface of said semiconductor illuminated by said source, a sweep function generator, means for connecting said generator to said non-rectifying connections, means for operating said generator to produce a rotating electric field in said semiconductor, a rectifying connection positioned at the center point of the surface of said semiconductor to which said non-rectifying connections are also connected, an output lead connected to said rectifying connection, said rotating electric field forcing said minority charge carriers to said rectifying connection and producing a series of electric pulses along said lead in a pattern related to said light pattern as recorded in said illuminated area in a predetermined manner.

8. A photoelectric coding circuit comprising, in combination, a photoconductive semiconductor of the type having mobile minority charge carriers and in the form of a disk, a light source, an electromechanically operated shutter mechanism, means including said shutter mechanism for controlling the operation of said source to project light rays along a path on to a flat surface of said semiconductor, a member comprising a plurality of circularly arranged apertures of predetermined configuration positioned in said path, said light rays being converted into a spacial light pattern containing coded information corresponding to the configuration of said apertures upon the passage of said light rays therethrough, whereby a plurality of areas are illuminated circularly about said surface of said semiconductor of a configuration similar to the configuration of said apertures, the application of said spacial light pattern to said surface of said semiconductor causing the generation of minority charge carriers in said illuminated areas, a plurality of non-rectifying connections arranged symmetrically along the edge of the flat surface of said semiconductor not illuminated by said source, a sweep function generator, means for connecting said generator to said non-rectifying connections, means for operating said generator to produce a rotating electric field in said semiconductor, a rectifying connection positioned at the center point of the surface of said semiconductor to which said non-rectifying connections are also connected, an output lead connected to said rectifying connection, said rotating electric field operating to force said minority charge carriers from each of said areas in turn to said rectifying connection in accordance with the direction of passage of said field, a series of electric pulses being produced along said lead in a pattern related to said coded information contained in said spacial light pattern in a predetermined manner.

9. A keyboard coding unit comprising, in combination, a photoconductive semiconductor of the type having mobile minority charge carriers, a light source, means for focusing light rays emanating from said source into a light path, a shutter cutting off said path, said keyboard comprising a plurality of keying devices, each of said devices including a member in which apertures of predetermined configuration are positioned, means for moving said shutter out of said path in response to the selective operation of said devices, the operation of a keying device also serving to position said apertures in said member of said operated device in said path, said light rays upons passing through said apertures of said operated device being converted to a corresponding spacial light pattern which is projected from said apertures of said operated device on to areas of a surface of said semiconductor, the application of said light pattern to the surface of said semiconductor causing the generation of minority charge carriers in the illuminated areas, a sweep function generator connected to said semiconductor, means for operating said generator in response to the movement of said shutter to produce a rotating electric field in said semiconductor, a collector electrode connected to the center point of a surface of said semiconductor, an output lead connected to said electrode, said rotating electric field forcing said minority charge carriers from said illuminated areas in turn to said electrode and producing a series of electric pulses along said lead in a pattern related to said light pattern in a predetermined manner.

10. A keyboard coding unit comprising, in combination, a photoconductive semiconductor of the type having mobile minority charge carriers, a light source, means for focusing light rays emanating from said source into a light path, a shutter cutting off said path, said keyboard comprising a plurality of keying devices, each of said devices including a member in which apertures of predetermined configuration are positioned, means for moving said shutter out of said path in response to the selective operation of said devices, the operation of a keying device also serving to position said apertures in said member of said operated device in said path, said light rays upon passing through said apertures of said operated device being converted to a corresponding spacial light pattern which is projected from said apertures of said operated device on to areas of a surface of said semiconductor, the application of said light pattern to the surface of said semiconductor causing the generation of minority charge carriers in the illuminated areas, a plurality of non-rectifying connections arranged symmetrically along the edge of a surface of said semiconductor, a sweep function generator, means for connecting said generator to said non-rectifying connections, means for operating said generator to produce a rotating electric field in said semiconductor, a rectifying connection positioned at the center point of a surface of said semiconductor, an output lead connected to said rectifying connection, said rotating electric field forcing said minority charge carriers from said illuminated areas in turn to said rectifying connection and producing a series of electric pulses along said lead in a pattern related to said light pattern in a predetermined manner.

11. A keyboard coding unit comprising, in combination, a photoconductive semiconductor of the type having mobile minority charge carriers and in the form of a disk, a light source, means for focusing light rays emanating from said source into a light path, a shutter cutting off said path, said keyboard comprising a plurality of keying devices, each of said devices including a member in which apertures of predetermined configuration are positioned, means for moving said shutter out of said path in response to the selective operation of said devices, the operation of a keying device also serving to position said apertures in said member of said operated device in said path, said light rays upon passing through said apertures of said operated device being converted to a corresponding spacial light pattern which is projected from said apertures of said operated device on to areas of a flat surface of said semiconductor, the application of said light pattern to said surface of said semiconductor causing the generation of minority charge carriers in the illuminated areas, a plurality of non-rectifying connections arranged symmetrically along the edge of the flat surface of said semiconductor not illuminated by said source, a sweep function generator, means for connecting said generator to said nonrectifying connections, means for operating said generator to produce a rotating electric field in said semiconductor, a rectifying connection positioned at the center point of the surface of said semiconductor to which said non-rectifying connections are also connected, an output lead connected to said rectifying connection, said rotating electric field forcing said minority charge carriers from said illuminated areas in turn to said rectifying connection and producing a series of electric pulses along said lead in a pattern related to said light pattern in a predetermined manner.

12. A photoelectric coding circuit comprising, in combination, a photoconductive semiconductor of the type having mobile minority charge carriers and in the form of a disk, a plurality of light sources, each of said sources being operated by control means to project a spacial light pattern on to an area of a flat surface of said semiconductor, said areas being arranged circularly about said surface of said semiconductor, the application of said spacial light patterns to said surface causing the generation of minority charge carriers in the illuminated areas, a sweep function generator connected to said semiconductor, means for operating said generator to produce a rotating electric field in said semiconductor, a collector electrode connected to the center point of a flat surface of said semiconductor, an output lead connected to said collector electrode, said rotating electric field forcing said minority charge carriers from each of said illuminated areas in turn to said collector electrode in accordance with the direction of passage of said field, the operation of said field producing a series of electric pulses along said lead in a pattern related to said light pattern in a predetermined manner.

13. A photoelectric coding circuit comprising, in combination, a photoconductive semiconductor of the type having mobile minority charge carriers, a light source, means for controlling the operation of said source to project a spacial light pattern of predetermined intensity and width on to an area of a surface of said semiconductor, the application of said spacial light pattern to said surface causing the generation of minority charge carriers in the illuminated area, a sweep function generator connected to said semiconductor, means for operating said generator to produce a rotating electric field in said semiconductor, a collector electrode connected to a surface of said semiconductor, an output lead connected to said collector electrode, said rotating electric field forcing said minority carriers to said collector electrode and producing a series of electric pulses along said lead in a pattern directly related to the intensity and width of said light pattern in a predetermined manner.

14. In combination, a photoconductive semiconductor of the type having mobile minority charge carriers, a light source, means for controlling the operation of said source to project a spacial light pattern on to an area of a surface of said semiconductor, the application of said spacial light pattern to said surface causing the generation of minority charge carriers in the illuminated area, a plurality of non-rectifying connections arranged symmetrically along the edge of a surface of said semiconductor, a sweep function generator connected to said non-rectifying connections, means for operating said generator to produce a rotating electric field in said semiconductor, a collector electrode connected to a surface of said semiconductor, an output lead connected to said collector electrode, said rotating electric field forcing said minority charge carriers to said collector electrode and producing a series of electric pulses in said lead in a pattern related to said light pattern in a predetermined manner.

15. In combination, a photoconductive semiconductor of the type having mobile minority charge carriers, a light source, means for controlling the operation of said source to project a spacial light pattern on to an area of a surface of said semiconductor, the application of said spacial light pattern to said surface causing the generation of minority charge carriers in the illuminated area, means for producing a rotating electric field in said semiconductor, a collector electrode connected to a surface of said semiconductor, means for deriving energy from said collector electrode in a pattern related to said light pattern in a predtermined manner.

16. A combination as defined in claim 15 and wherein said last means includes a source of unidirectional potential having a positive terminal connected to said collector electrode.

17. In combination, a photoconductive semiconductor of the type having mobile charge carriers, a light source, means for controlling the operation of said source to project a spacial light pattern on to an area of a surface of said semiconductor, the application of said spacial light pattern to said surface causing the generation of charge carriers in the illuminated area, means for producing a rotating electric field in said semiconductor, and means for deriving energy from said semiconductor.

References Cited in the file of this patent

UNITED STATES PATENTS

| | | |
|---|---|---|
| 2,541,030 | Busingnies | Feb. 13, 1951 |
| 2,582,850 | Rose | Jan. 12, 1952 |
| 2,592,683 | Gray | Apr. 15, 1952 |
| 2,641,753 | Oliwa | June 9, 1953 |
| 2,691,736 | Haynes | Oct. 12, 1954 |
| 2,754,360 | Dersch | July 10, 1956 |
| 2,794,863 | Roosbroech | June 4, 1957 |

UNITED STATES PATENT OFFICE
CERTIFICATE OF CORRECTION

November 18, 1958

Patent No. 2,861,262

Jacques I. Pankove

It is hereby certified that error appears in the printed specification of the above numbered patent requiring correction and that the said Letters Patent should read as corrected below.

Column 2, through column 14, for "spacial", wherever it appears, read -- spatial --.

Signed and sealed this 31st day of March 1959.

(SEAL)
Attest:

KARL H. AXLINE
Attesting Officer

ROBERT C. WATSON
Commissioner of Patents